April 9, 1968 P. A. GHILONI ET AL 3,377,455

ELECTRICAL NETWORK UTILIZING A SINGLE MODULE IN WHICH THE CIRCUITRY AND CROSS-CONNECTION FIELD ARE PART OF THE SAME MODULE

Filed April 13, 1965 5 Sheets-Sheet 1

INVENTORS P. A. GHILONI
C. D. IRISH
J. J. KASTEN
J. A. SEIFERT

BY E. J. Linder

ATTORNEY

April 9, 1968 P. A. GHILONI ET AL 3,377,455

ELECTRICAL NETWORK UTILIZING A SINGLE MODULE IN WHICH THE CIRCUITRY AND CROSS-CONNECTION FIELD ARE PART OF THE SAME MODULE

Filed April 13, 1965 5 Sheets-Sheet 2

April 9, 1968 P. A. GHILONI ET AL 3,377,455

ELECTRICAL NETWORK UTILIZING A SINGLE MODULE IN WHICH THE CIRCUITRY AND CROSS-CONNECTION FIELD ARE PART OF THE SAME MODULE

Filed April 13, 1965 5 Sheets-Sheet 3

United States Patent Office 3,377,455

Patented Apr. 9, 1968

3,377,455

ELECTRICAL NETWORK UTILIZING A SINGLE MODULE IN WHICH THE CIRCUITRY AND CROSS-CONNECTION FIELD ARE PART OF THE SAME MODULE

Peter A. Ghiloni, Lincroft, Carleton D. Irish, Neptune, Joseph J. Kasten, Freehold, and Joseph A. Seifert, Atlantic Highlands, N.J., assignors to Bell Telephone Laboratories, Incorporated, New York, N.Y., a corporation of New York Filed Apr. 13, 1965, Ser. No. 447,813
11 Claims. (Cl. 200—175)

This invention relates to equipment for use in a direct progressive type telephone central office and more particularly, to equipment for automatically identifying telephone numbers.

The prior art includes equipment for automatically identifying telephone numbers in a direct progressive type telephone central office. This equipment has generally been designed with the large central office in mind in that the larger the office is, the more efficient and economical the known equipment becomes.

However, in relatively small central offices, for example, those that serve 10,000 or fewer numbers, the known equipment is economically impractical to use because of its high initial cost and inflexibility. The known equipment is either an arrangement where circuitry, in a fixed physical mounting, is dedicated by hard wiring to a specific telephone number and cannot be easily modified, or an arrangement where the circuitry can be assigned to any specific telephone number by using a separate cross-connection field.

The first arrangement requires the purchase of equipment in lots of certain minimum sizes that are inefficient and expensive in small offices because extraneous equipment must be purchased. The second arrangement requires a separate piece of equipment for circuitry and a separate piece of equipment for a cross-connection field which results in large installations.

The invention is embodied within a single physical module, in which the circuitry and cross-connection field are part of the same module. The modules may be multiplied to expand the capacity of the system yet the individual circuits on each module are not predicated to any specific or fixed telephone number but may be easily and freely assigned depending upon need.

Each module is comprised of a frame upon which a plurality of bus bars and a plurality of conductor modules are mounted. The bus bars and modules are grouped on the frame in two 100-telephone number matrix groups. The matrix groups are separated from each other by a distribution block and two printed circuit board connectors.

The conductor modules are comprised of an elongated rectangular insulating strip through which a plurality of conductors extend. The conductors or terminals extend from the strip on two opposite sides. A bus bar is contained within the strip and runs in a direction parallel to the longitudinal dimension of the strip.

The terminals that extend from one side of each strip are adapted to mount and interconnect active electrical circuit components that are used for number identification. The terminals that extend from the other side of the strip form a cross-connection field in conjunction with the plurality of bus bars previously mentioned.

Thus, when a number of strips are mounted upon a frame, the resulting structure provides a circuit mounting and a cross-connection field on opposite sides of a single structure.

The distribution block is similar to the conductor modules in that it is comprised of an elongated insulating block through which a plurality of conductors extend. The conductors extend from opposite sides of the block and are arranged in a predetermined pattern that will be subsequently described.

The function of the distribution block is to accept and assign signals from the various circuits that are contained on the individual conductor modules. The assignment is made by means of hard wiring.

The above structure is capable of defining four numbers of a telephone number. For small offices where identification of other digits is not required, this is sufficient. The "units" and "tens" digits are directly identified by the circuitry on the conductor modules. The "hundreds" and "thousands" digits are indirectly identified by the conductor module circuitry and directly identified by the hard wiring assignment on the identification block. Other information is also obtainable from the network and will be subsequently described.

The invention will be better understood, its advantages and features more readily apparent, upon a study of the following detailed description of an illustrative embodiment of the invention when it is read in conjunction with the drawing, in which.

Figure 1:
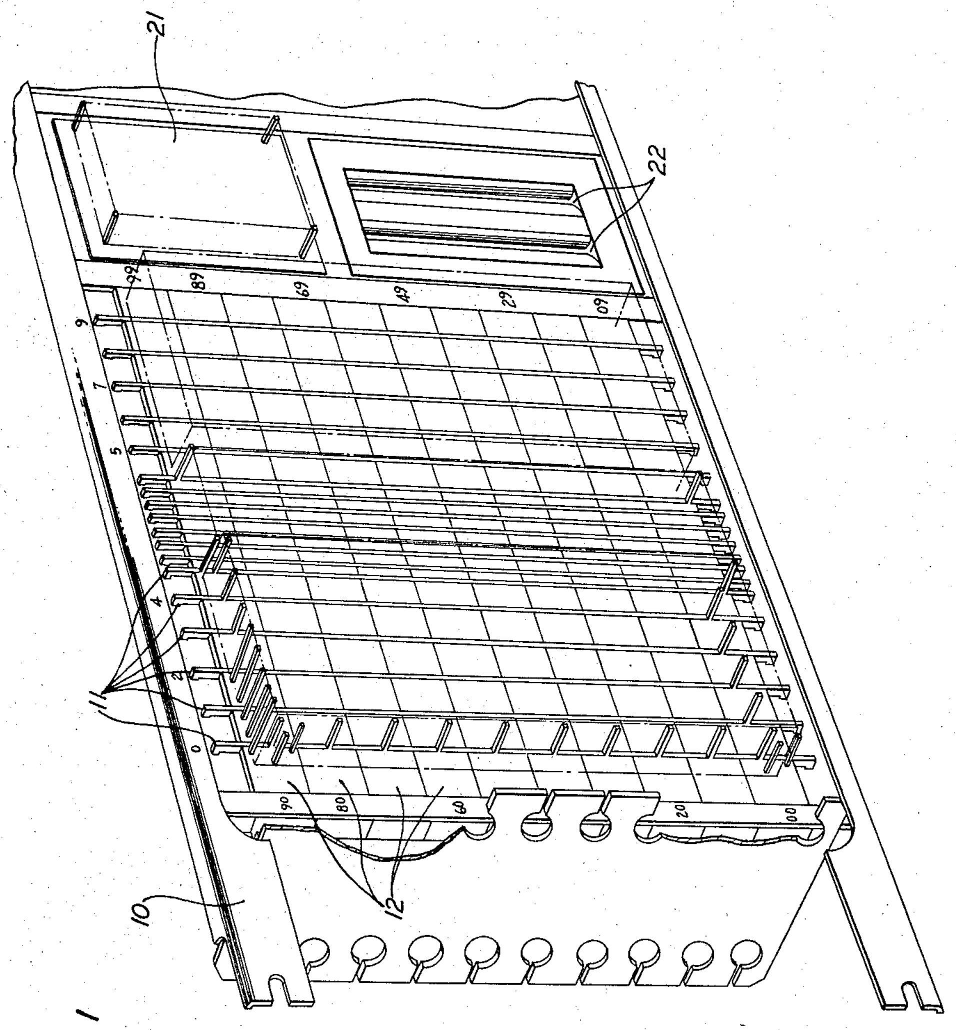
FIG. 1 is a perspective drawing of a portion of the preferred embodiment of the invention.

In accordance with the preferred embodiment of the invention, the network is comprised of a frame 10 upon which are mounted a plurality of bus bars 11 and conductor modules 12. The conductor modules 12 further comprise an insulating block 13 through which extend a plurality of electrical terminals 14. The terminals 14 are arranged in a predetermined geometric pattern and extend a considerable distance from two opposite faces 26 and 27 of the block 13. The ends of the terminals 14 that extend from the face 26 of the block 13 form a circuit mounting while the ends of the terminals 14 that extend from the face 27 of the block 13 form a portion of a cross-connection field.

Figure 7:
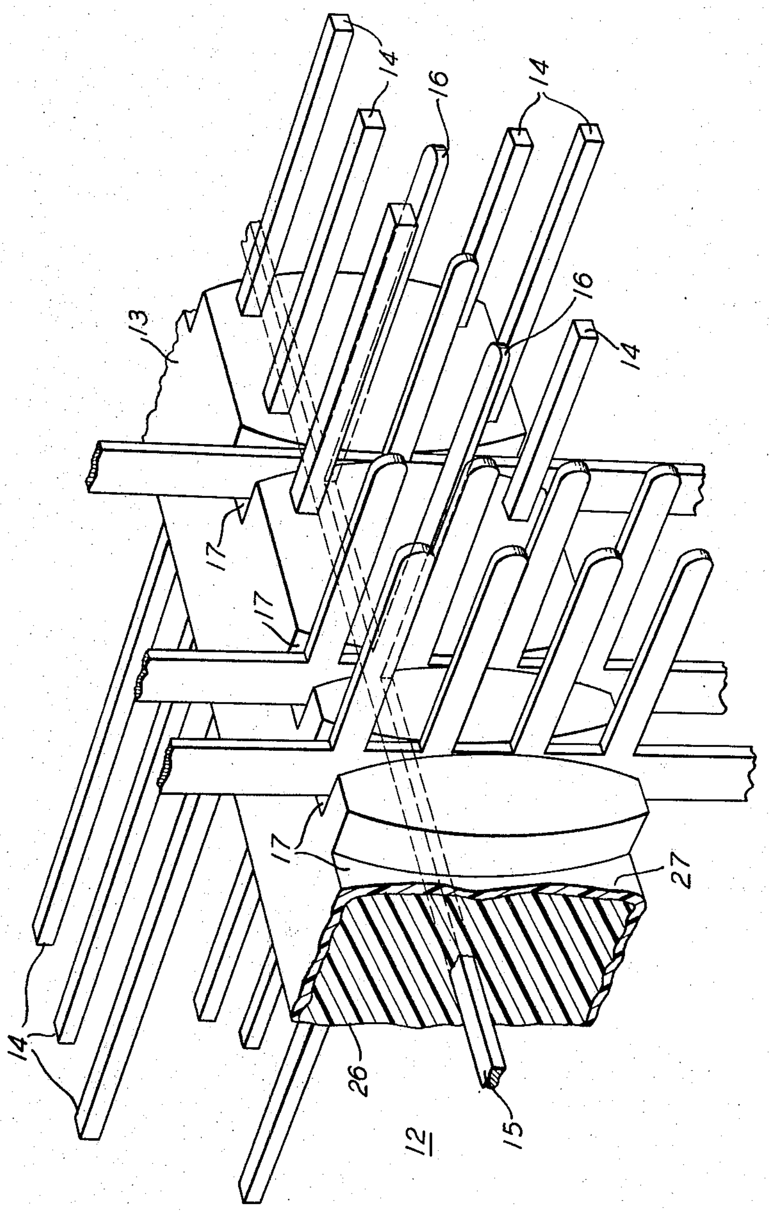
FIG. 7 is an enlarged perspective view of a portion of a conductor module showing the relationship of the various conductors to each other.

Embedded within the block 13 is a bus bar (see FIG. 7) that extends the longitudinal length of the block 13. The bar 15 further includes a number of projections 16 that extend in the same direction as the ends of the terminals 14 that extend from the face 27 of the block 13. Each bus bar 15 further includes two projections 28 that are located at opposite ends of the bus bar 15 and extend through the face 26 of the block 13.

The block 13 further includes a plurality of spaced trough-like indentations 17, in which the bus bars 11 interfit when the block 13 is attached to the frame 10.

As shown in FIGS. 2, 4, 5, and 7, the terminals 14 are mounted in the block 13 in a pattern. This pattern comprises the segregation of the terminals 14 into two major groups of terminals 14 in opposite ends of the block 13. The major groups are comprised of five subgroups of four terminals 14. Running through each subgroup of four terminals 14 is an indentation 17 and a plurality of indentations 17 are located between the major groups of terminals 14.

The terminals 14 that extend from the face 26 of the block 13 are adapted for mounting a cluster 18 of active circuit components. Each cluster 18 is comprised of a resistor 19 and three glow lamps 20 that are banded together by a heat shrinkable sleeve 29.

The frame 10 is adapted to mount the conductor modules 12 in two matrtx groups; separating the matrix groups on the frame 10 is a distribution block 21 and two connectors 22. Each of the connectors 22 is adapted to receive a printed circuit card 23 on which are mounted a plurality of diodes 24.

Figure 2:
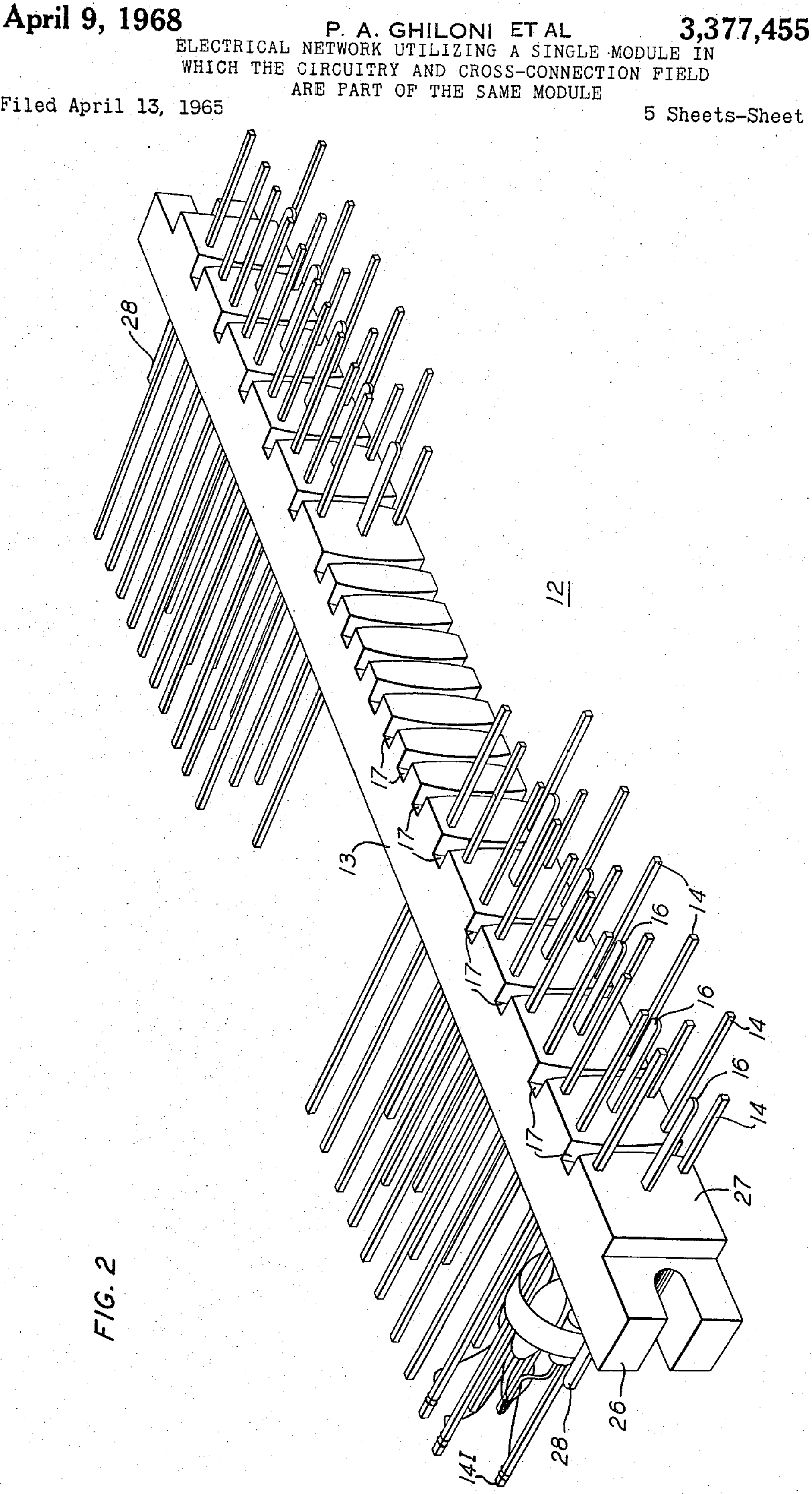
FIG. 2 is a perspective view of a conductor module from which the network is built.
Figure 3:
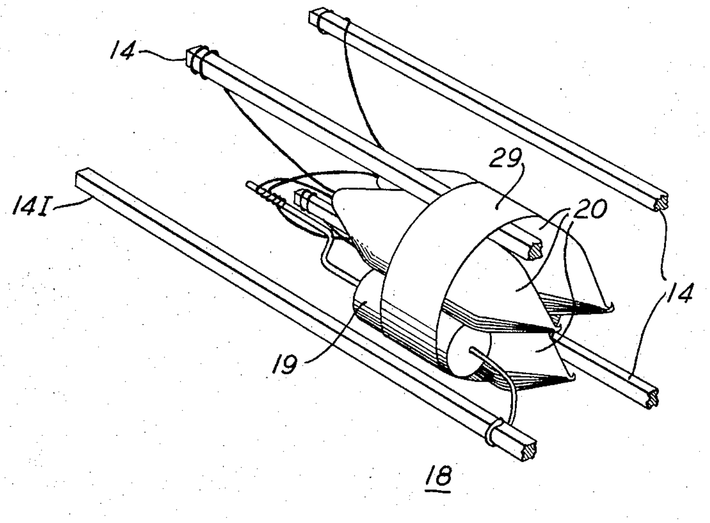
FIG. 3 is a perspective view of the active circuitry that is mounted upon the conductor modules.
Figure 4:
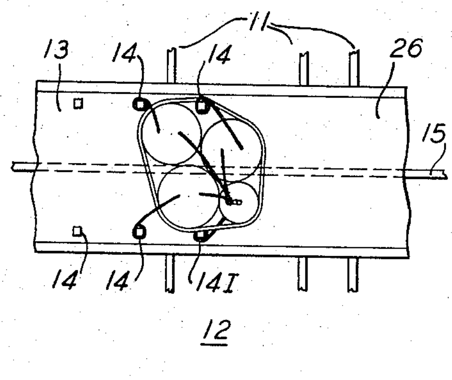
FIG. 4 is a plan view showing the wiring of the active circuitry to the terminals of a conductor module.

With specific reference to FIGS. 2, 3, and 4, it will be noted that a circuit cluster 18 fits between the ends of each subgroup of four terminals 14 that extend from the face 26 of the block 13. One terminal 14 of each subgroup of terminals 14 is an input terminal 14I. A sleeve lead, which is peculiar to each telephone line, is connected by means of wiring to an input terminal 14I. In other words, the sleeve lead from each individual telephone line that terminates in a central office served by equipment of this design will be assigned and connected to a specific input terminal 14I.

One lead of the resistor 19 is connected to the terminal 14I; the other lead of the resistor 13 is connected to one lead from each of the three glow lamps 20. The remaining lead from each of the three glow lamps 20 is connected to one of the remaining three terminals 14 in the subgroup of terminals 14.

Figure 5:
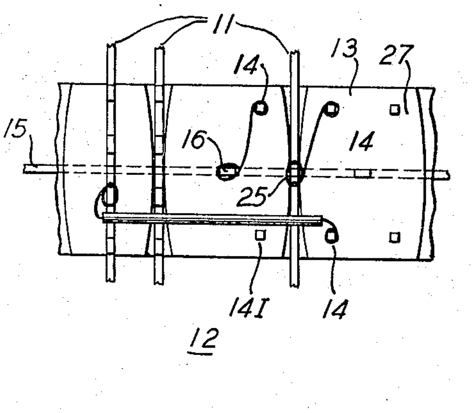
FIG. 5 is a plan view showing the cross-connection field.
Figures 6, 8:
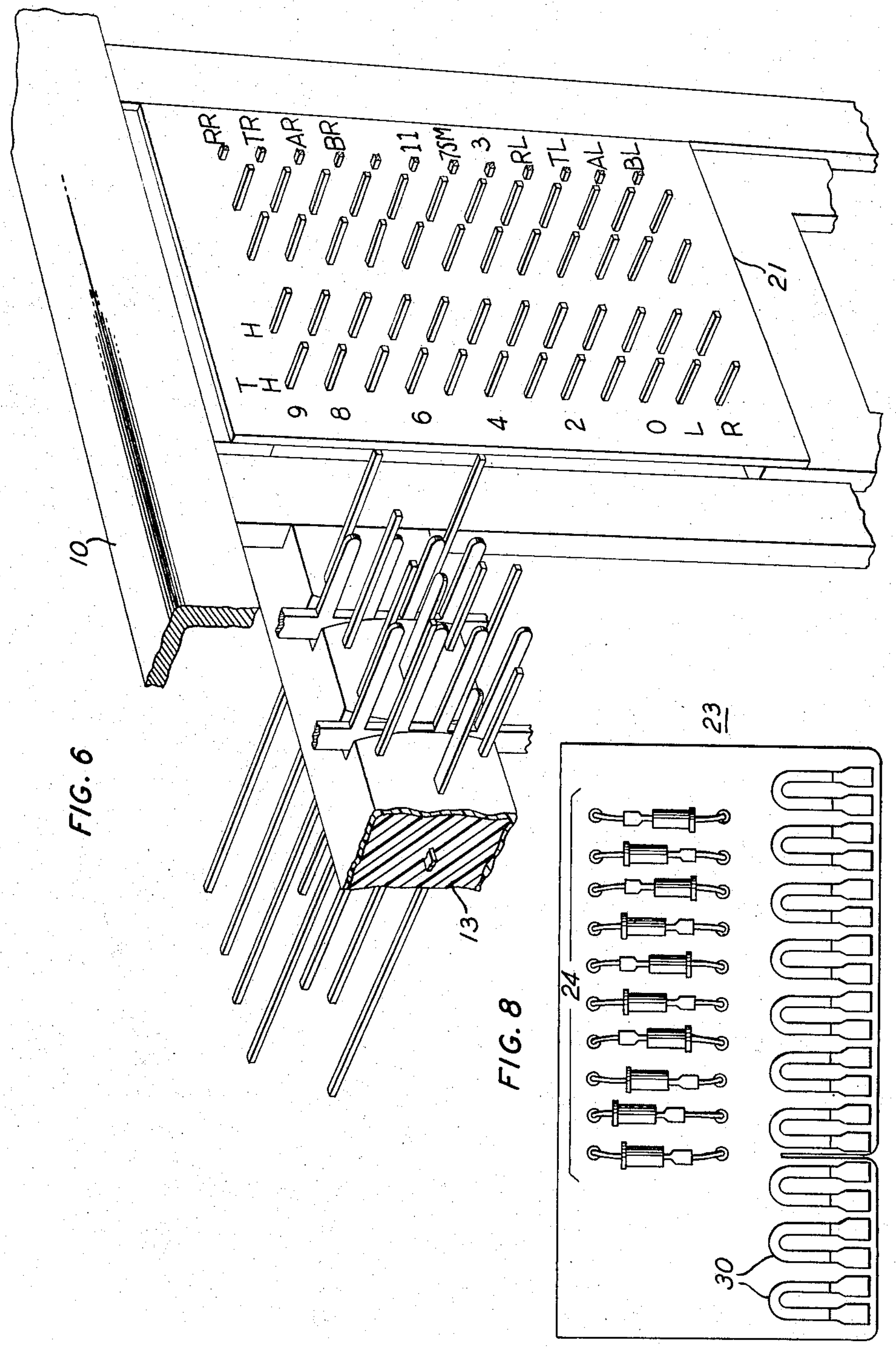
FIG. 6 is a perspective view of the distribution block.
FIG. 8 is a plan view of one side of a printed circuit board.

With specific reference to FIGS. 4 and 5, the three terminals 14 to which the leads from the glow lamps 20 have been connected extend through the block 13 and protrude from the opposite face 27 of the block 13. One of the terminals 14 is strapped to a projection 16 of the bus bar 15. One of the terminals 14 is strapped to an extension 25 on the bus bar 11 that passes between the subgroup of terminals 14; the third terminal 14 is strapped to an extension 25 of a bus bar 11 that is mounted in one of the indentations 17 between the major groups of terminals 14.

The extensions 16 of the bus bar 15 identify the tens digit of the phone number. The extensions 25 of the bus bars 11 that are located between the terminals 14 of the subgroups identify the units digit of the phone number, and the extensions 25 of the bus bars 11 that are located between the two major groups of terminals 14 identify the service mark and subsequently the hundreds and thousands digits of the phone number.

In other words, the conductor modules 12 and bus bars 11 form a matrix. The bus bar 15 that is contained within each conductor module 12 identifies the "tens" digit of the telephone number. Every terminal 14 that is strapped to the same bus bar 15 will have the same "tens" digit. On the other hand, the bus bars 11 that extend through the center of each subgroup of terminals 14 identify the "units" digit of the telephone number. Thus, every terminals 14 that is strapped in the same bus bar 11 will have 'he same "units" digit.

The bus bars 11 that are contained in the center of each conductor module 12 and that separate the major groups of terminals 14 are used to identify the "hundreds" and "thousands" digits of the number and also provides other needed information such as the service mark. The service mark is information that indicates the kind or type service of the subscriber. Thus, each phone may be identified as to whether or not it is a private, party, special, or other type of service line. Every terminal 14 that is strapped to the same bus bar 11 in the center of the module 12 will have the same "hundreds" or "thousands" digit and service mark.

In accordance with the above, and with reference to FIG. 1, it will be noted that the frame 10 includes numbers along its top members that are located near the bus bars 11. The numbers 0, 1, 2, etc., correspond to the "units" digits of the telephone numbers. Along the side of the frame 10 are located the numbers 00, 10, 20, etc. These numbers are near each conductor module 12 and represent the "tens" digit. As discussed before, the bus bars 11 that are located between the major groups of terminals 14 are used to identify the service mark and the "hundreds" and "thousands" digits.

From a study of the above and FIG. 1, it is clear that each matrix group of conductor modules 12 and their associated bus bars 11 are capable of identifying 100 telephone numbers. Thus, each frame 10 has a 200-number capacity.

Because each matrix group has a capacity of 100 numbers, all of the numbers identified by a matrix group must have the same "hundreds" digit and the same "thousands" digit. Thus, as soon as the first sleeve lead from any random telephone line is connected a terminal 14I telephone line is connected to the appropriate input terminal 14I of a matrix group, all the rest of the telephone numbers identified by that matrix group must also have the same "hundreds" and "thousands" digit. However, until that first sleeve lead is connected to an input terminal 14I, the matrix group may be assigned to any "hundreds" and "thousands" digit desired.

It should be further pointed out, that the assignment of one matrix group of terminals 14 on a frame 10, does not necessarily mean that the other matrix group of terminals 14 on the frame 10 must have the same "hundreds" and "thousands" digit. Both matrix groups may be freely assigned to any combination of "hundreds" and "thousands" digits. However, as soon as the first subgroup of terminals 14 in a matrix group are assigned, the rest of the terminals 14 in that matrix group must also have the same "hundreds" and "thousands" digits.

When the cross-connection field is completed on faces 27 of the blocks 13, the "units" and "tens" buses 11 are strapped to bridge circuits 30 contained on the diode cards 23. From the cards 23, the "units" and "tens" circuits are wired directly to an identifier. The purpose of the bridge circuits 30 is to provide means for isolating each matrix group. When the cards 23 are taken out of the circuit, their associated matrix groups are also taken out of the circuit.

The third signal which is taken from one of the buses 11 that is located in the center of the module 12 is taken to the diode circuit on the circuit card 23. This signal is then split into three signals by means of the diodes 24 on the cards 23. The three signals are then taken by wiring to the distribution block 21 where three pieces of information, one from each signal, is obtained. The first signal is used to identify the "hundreds" digit of the telephone number and the second signal is used to identify the "thousands" digit of the telephone number. This is accomplished by strapping specific circuits on the printed circuit cards 23 to the terminals on the distribution block 21. The third signal is used to identify the service mark or type of service of the subscriber. Such identification is accomplished in the same manner as previously described for the "hundreds" and "thousands" digits of the number.

The wiring assignment and operation of the device may be understood from the following example. Suppose the phone number to be identified is 757–0624. The 7, 5, and 7 digits will be identified by the central office in which the number is located. The network system would be used to identify the remaining four numbers, in particular, 0, 6, 2, and 4. These numbers will be identified in the following manner: The sleeve lead that is associated with that telephone number will be connected to the input terminal 14I of the fifth subgroup of terminals 14 on the conductor module 12 that is third from the bottom of the frame 10. From the markings on the frame 10 nearest to the conductor module 12 that is third from the bottom, it will be seen that the bus bar 15 contained in that module 12 identifies all terminals 14 strapped to that bus 15 as a 2 "tens" digit. The fifth subgroup of terminals 14 on that module 12 can also be identified as the 4 "units" digit by the bus bar 11 that bisects the fifth subgroup of terminals 14. Thus, when an electrical pulse is placed on this terminal 14I, it will fire the three neon glow lamps 20 associated with the input terminal 14I.

The firing of the three lamps 20 will result in three separate signals, one of which will identify the units digit as a 4, the other of which will identify the tens digit as a 2, and the third signal will be taken from the bus bar 11 to one of the cards 23. By means of the diodes 24 that are mounted upon that card 23, that signal will be once again divided into three separate signals. These signals, by means of wiring, will be taken to the distribution block 21 wherein, by means of wiring on the distribution block 21, the first signal will indicate the type of service associated with the telephone number, the other two signals, by means of wiring on the distribution block 21, will identify the "thousands" and "hundreds" digits of the number.

From the above description, it becomes apparent that the network includes a circuit mounting and a cross-connection field on the same singular frame 10 without requiring that individual networks be dedicated to any specific or fixed number. By means of the wiring of the distribution block 21, the network may be assigned to any desired group of numbers.

It will be obvious to those skilled in the art that various changes or alterations of the preferred embodiment shown in the various figures of the drawing can be made. These changes and alterations are too numerous to enumerate and need not be because they are obvious and well within the scope of the invention disclosed above and the appended claims.

What is claimed is:

1. An electrical network comprising a plurality of modules mounted upon a frame, each of said modules including an insulating block and a plurality of electrical terminals, said terminals extending through said block and from a first and a second face of said block, said terminals that extend from said first face form a portion of a cross-connection field, said terminals that extend from said second face of said block form a mounting for circuit components, each of said blocks including a module bus bar, the latter having a plurality of projections that extend from said first face and form a further portion of said cross-connection field, said frame including a plurality of frame bus bars, each of the latter having a plurality of projections that form a further portion of said cross-connection field, said frame further including a distribution block having electrical terminals, said first mentioned terminals connected in a pattern to said projections of said module bus bars and said projections of said frame bus bars, said projections of said bus bars in turn connected to said terminals of said distribution block.

2. Apparatus according to claim 1 wherein said first mentioned terminals extend from said first face of said insulating block in a plurality of groups, one of said terminals of each of said groups is connected to a projection on said module bus bar, another of said terminals in each of said groups is connected to a projection on said frame bus bars, and another of said terminals of each of said groups is connected to a projection on another of said frame bus bars.

3. Apparatus according to claim 1 wherein said frame further includes isolation means, said means adapted to interrupt said connections between said first mentioned electrical terminals and said electrical terminals of said distribution block.

4. Apparatus according to claim 2 wherein said frame further includes isolation means, said means adapted to interrupt said connections between said first mentioned terminals and said electrical terminals of said distribution block.

5. An electrical network comprising a plurality of modules and a plurality of bus bars mounted upon a frame, said modules including an insulating block and a plurality of terminals mounted in said block, said terminals extending through said block and from a first face and a second face of said block, said terminals mounted in said block in a plurality of groups, each of said bus bars including a plurality of projections, each of said insulating blocks including a module bus bar, said last mentioned bus bar including a plurality of projections that extend from said first face of said block, said terminals and said projections that extend from said first face and said projections of said bus bars form a cross-connection field, said terminals that extend from said second face form a mounting for circuit components.

6. The device described in claim 5 wherein said frame further includes distribution means, said means comprising a plurality of terminals mounted in an insulating block, said terminals of said means selectively connected to said projections on said bus bars.

7. Apparatus according to claim 5 wherein said frame further includes isolation means, said isolation means comprising means for interrupting said connections between said electrical terminals on said distribution means and said projections on said bus bars.

8. Apparatus according to claim 6 wherein said frame further includes isolation means, said isolation means comprising means for interrupting said connections between said electrical terminals on said distribution means and said projections on said bus bars.

9. An electrical network comprising a plurality of modules mounted upon a frame, each of said modules including an insulating block and a plurality of terminals mounted in said block, said terminals extending through said block and from a first face and a second face of said block, said terminals being mounted in said block in groups of four terminals, each of said modules further including a module bus bar, the latter having a plurality of projections that extend from said first face, each of said projections extending from said first face in a position adjacent a group of terminals, said frame including a plurality of bus bars, said bus bars being mounted on said frame so that each group of terminals is located adjacent at least one bus bar, said terminals that extend from said second face form a mounting for circuit components, said circuit components mounted on said mounting, one of said terminals being an input terminal, one of said terminals of each of said groups of terminals that extend from said first face being connected to a projection on said module bus bar, said module bus bar being identified with a "tens" digit of a telephone number, another of said terminals of each of said groups of terminals being connected to a bus bar that is adjacent said group, said last mentioned bus bar being identified with a "units" digit of a telephone number, another of said terminals of each of said group being connected to another of said bus bars.

10. Apparatus according to claim 9 wherein said frame further includes distribution means, said means comprising a plurality of terminals mounted upon an insulating block, said terminals of said means being selectively connected to said bus bars.

11. Apparatus according to claim 10 wherein said frame further includes isolation means, said isolation means comprising means for interrupting said connection between said distribution means and said bus bars.

References Cited

UNITED STATES PATENTS

| | | | |
|---|---|---|---|
| 2,901,547 | 8/1959 | Miloche | 200—175 |
| 3,293,502 | 12/1966 | Beierle | 317—112 |

BERNARD A. GILHEANY, *Primary Examiner.*

H. BROOME, *Assistant Examiner.*